United States Patent
Caputo et al.

(10) Patent No.: US 12,250,016 B1
(45) Date of Patent: Mar. 11, 2025

(54) ACCESSORY FOR SMART DEVICES WITH PRIVACY FEATURES AND A METHOD FOR CONTROLLING THE SAME

(71) Applicant: i Privacy Now LLC, Newtown, PA (US)

(72) Inventors: Phillip D. Caputo, Newtown, PA (US); Thomas M. Steel, Santa Monica, CA (US); Gerard Patrick Murray, Carlsbad, CA (US)

(73) Assignee: i Privacy Now LLC, Newtown, PA (US)

( * ) Notice: Subject to any disclaimer, the term of this patent is extended or adjusted under 35 U.S.C. 154(b) by 0 days.

(21) Appl. No.: 18/648,233

(22) Filed: Apr. 26, 2024

(51) Int. Cl.
*H04B 1/3827* (2015.01)

(52) U.S. Cl.
CPC ................. *H04B 1/3838* (2013.01)

(58) Field of Classification Search
CPC ............... H04K 2203/12; H04K 3/825; H04K 2203/16; H04K 3/42; H04K 3/43; G10K 11/1754; G10K 11/175; G10K 11/1752; H04M 1/68; H04B 1/3838
See application file for complete search history.

(56) References Cited

U.S. PATENT DOCUMENTS

| | | | | |
|---|---|---|---|---|
| 4,441,085 | A * | 4/1984 | Sakamoto | H03F 1/34 330/207 P |
| 2016/0234356 | A1* | 8/2016 | Thomas | H04K 3/84 |
| 2022/0078556 | A1* | 3/2022 | Stachura | H04R 5/04 |
| 2023/0131816 | A1* | 4/2023 | Zheng | H04K 3/825 367/140 |
| 2023/0171338 | A1* | 6/2023 | Erez | H04M 1/72457 455/575.8 |

\* cited by examiner

*Primary Examiner* — Quoc Thai N Vu
(74) *Attorney, Agent, or Firm* — BakerHostetler

(57) ABSTRACT

An accessory for a smart device and a method from controlling the same includes at least one transducer per receiver of the smart device, each transducer physically located in close proximity to a physical location of each receiver. An amplifier outputs noisy frequency signals to each transducer at a power level sufficient to cause the signal-to-noise ratio at each receiver to be negative. A controller outputs the noisy frequency signals for each transducer to the amplifier according to a mode, the controller randomly hopping the noisy frequency signals for each transducer in a manner sufficient to prevent audio processing software associated with each receiver from being able to identify and cancel the noisy frequency signals.

24 Claims, 8 Drawing Sheets

ACCESSORY FOR SMART DEVICES WITH PRIVACY FEATURES AND A METHOD FOR CONTROLLING THE SAME

BACKGROUND INFORMATION

Smartphones, smart speakers, smart cars, smart thermostats, smart doorbells, smart locks, smart refrigerators, phablets and tablets, smartwatches, smart bands, smart keychains, smart glasses, etc., often contain technology enabling them to 'hear' and 'see' what is going on around them at all times (collectively, "smart devices"). By way of example, smart devices are able to detect a user's voice requests for the smart devices to perform certain actions, such as open an application, unlock a door, turn on/off a light, make a phone call, send a text message, take a picture, play a song, etc. To improve on the smart devices' ability to clearly hear such requests, most include multiple microphones and speakers, which can double as microphones (collectively "receivers") located in different places around the smart devices.

As a consequence, it can be difficult for smart devices not to hear the user at all times, which makes it difficult for a user to have privacy at times when the user does not want smart devices listening. As users are often not familiar with all of the features built into smart devices or the applications running thereon, the smart devices may be listening and recording and/or transmitting data away from the smart devices regarding what the smart devices has heard—without the user knowing the smart devices are doing so. And because the smart devices are designed to operate in noisy environments, the smart devices are equipped with hardware and software that enable the smart devices to cancel or filter away noise that impede the smart devices' ability to clearly hear a user. Simply covering a receiver or making additional noise around the smart device may do nothing to prevent the smart device from hearing.

Smart phones, one of the smart devices described above, are typically not sold with a protective case. Such cases are typically sold as an after-market accessory and come with a wide range of designs, colors and other features designed to protect the smart phone from being dropped or otherwise damaged from usage or to enhance the effectiveness of the phone in some other way. As the cases are designed to enhance and protect the smart phones, the cases are generally designed to improve features of the smart phones, such as the ability of the smart phone to hear, see (i.e., take digital images), and generate sound rather than prevent any of these abilities. Accordingly, there is a need for an accessory to smart devices that ensures a user has complete privacy from their smart device when desired.

TECHNICAL FIELD

The present disclosure relates generally, but not exclusively, to the field of accessories for smart devices.

SUMMARY

An embodiment is directed to an accessory for a smart device comprising at least one transducer per receiver in the smart device, each transducer physically located in close proximity to a physical location of each receiver. An amplifier outputs noisy frequency signals to each transducer at a power level sufficient to cause the signal-to-noise ratio at each receiver to be negative. A controller outputs the noisy frequency signals for each transducer to the amplifier according to a mode, the controller randomly hopping the noisy frequency signals for each transducer in a manner sufficient to prevent audio processing software associated with each receiver from being able to identify and cancel the noisy frequency signals.

An embodiment is directed to a method for controlling a mode of operation of an accessory for a smart device. The method comprising outputting noisy frequency signals from an amplifier to each of at least one transducer per receiver in the smart device at a power level sufficient to cause the signal-to-noise ratio at each receiver to be negative, each transducer being physically located in close proximity to a physical location of each receiver. The method further including outputting the noisy frequency signals from a controller for each transducer to the amplifier according to a mode, the controller randomly hopping the noisy frequency signals for each transducer in a manner sufficient to prevent audio processing software associated with each receiver from being able to identify and cancel the noisy frequency signals.

These and other features will be more clearly understood from the following detailed description taken in conjunction with the accompanying drawings and claims. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EMBODIMENTS

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
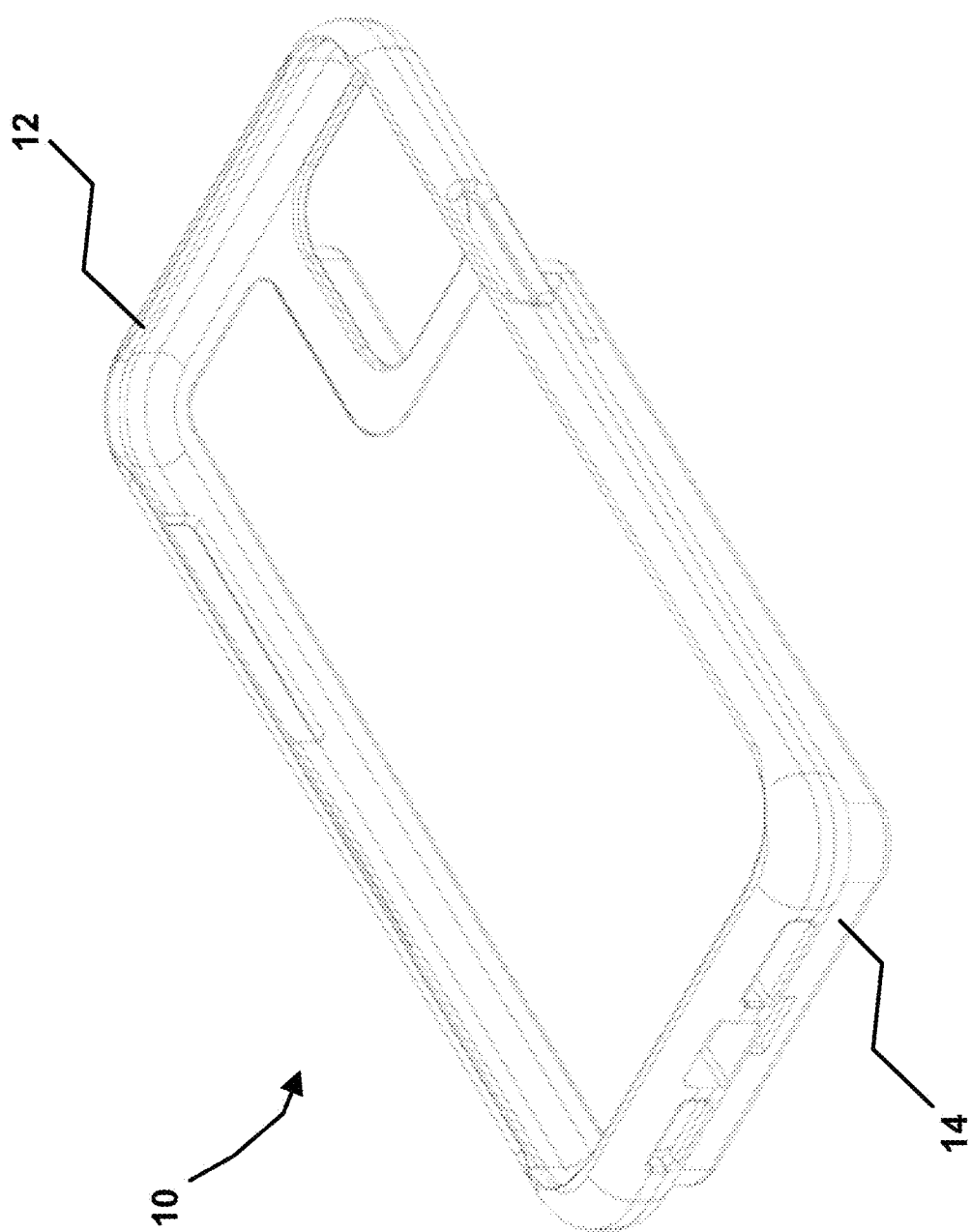
FIG. 1 is a top perspective view of a phone case accessory in accordance with an embodiment.
Figure 2:
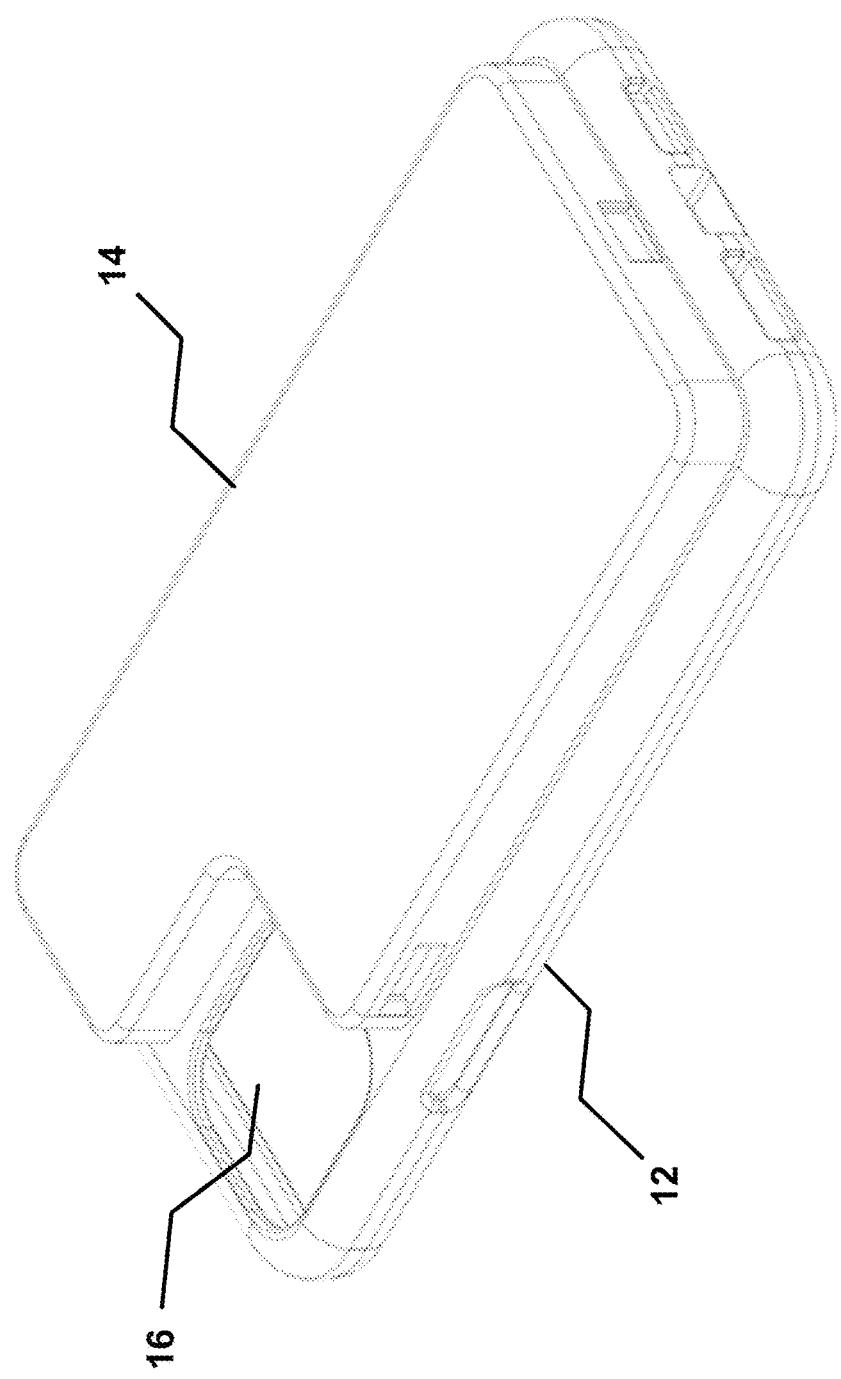
FIG. 2 is a bottom perspective view of the phone case accessory of FIG. 1 in accordance with an embodiment.

FIG. 1 is a top perspective view of a phone case accessory 10 in accordance with an embodiment. The phone case accessory 10 includes a protective frame 12 that is configured to fit tightly around a phone when inserted into the frame, and a component housing 14 that is connected to the back of the protective frame 12. FIG. 2 provides a bottom perspective view of the phone case accessory 10 and the component housing 14 attached to the back of the protective frame 12. FIG. 2 also illustrates how the component housing 14 is shaped around a lens opening 16 in the protective frame 12 that would permit a set of lenses to extend through the protective frame 12. Many phones now include a set of lenses having different focal properties, as well as lighting, that physically extend from the back of the phone, versus lens that are integrated into the phone so that the back of the phone is a smooth surface.

Figure 3:
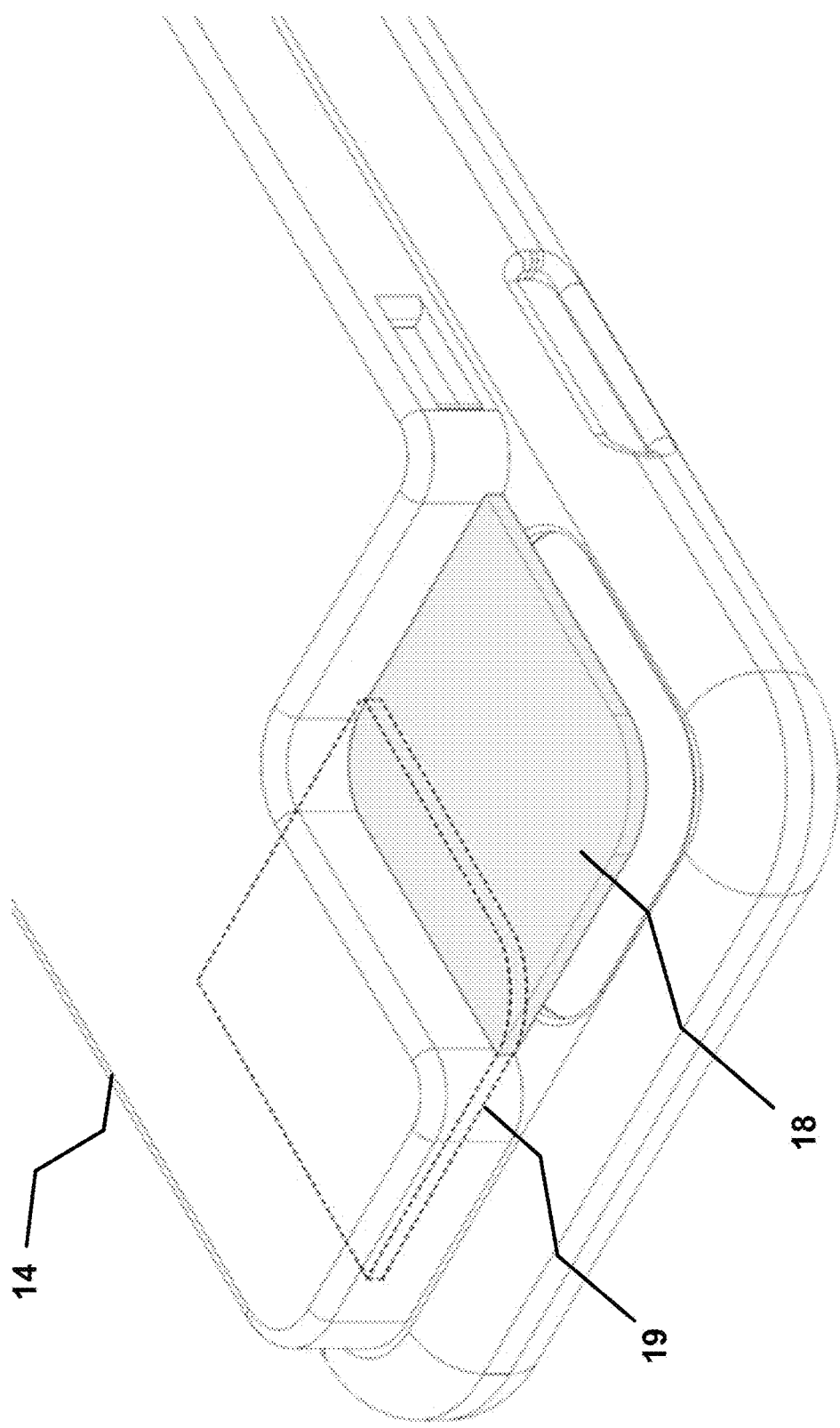
FIG. 3 is a partial perspective view of a camera blocking feature in accordance with an embodiment.

As shown in FIG. 3, the component housing 14 may include a retractable camera shutter 18, shown in its extended position, that block each of the lenses among the set of lenses from being able to capture images other than of the shutter 18. As illustrated by the dashed lines 19, the shutter 18 may be moved to a stored position within the component housing 14. Movement of the shutter 18 may be manually activated, such by a handle (not shown) that a user can grab with a finger or a mechanical lever (not shown) within the component housing 14 that a user can pull to move the shutter 18 in an out of the component housing. Alternatively, the shutter 18 may be activated by a motor (not shown) within the component housing 14 that moves the shutter from the stored position 19 to an extended position that covers the lenses.

The phone case accessory illustrated in FIGS. 1-3 and throughout the specification is one embodiment particularly associated with a smart device that is a phone. Other smart devices may be smart speakers, smart locks, smart homes, smart offices, security systems, entertainments systems, lighting, etc., that may or may not accommodate a similarly configured accessory. In some embodiments, the accessory may physically house the smart device but in other embodiments the accessory may be positioned on or near the smart device so that it may operate in a manner similar to the phone case accessory. For example, for a smart speaker, the accessory may be a housing that holds the speaker as well as the active components of the component housing. For a wall mounted smart device, the accessory may only hold the component housing and may be designed to be positioned over or next to the smart device in order to operate as intended. The particular description of a phone case accessory in the Specification and the Drawings is not intended to limit the applicability of the accessory to providing privacy features relative to other smart devices.

Figure 4:
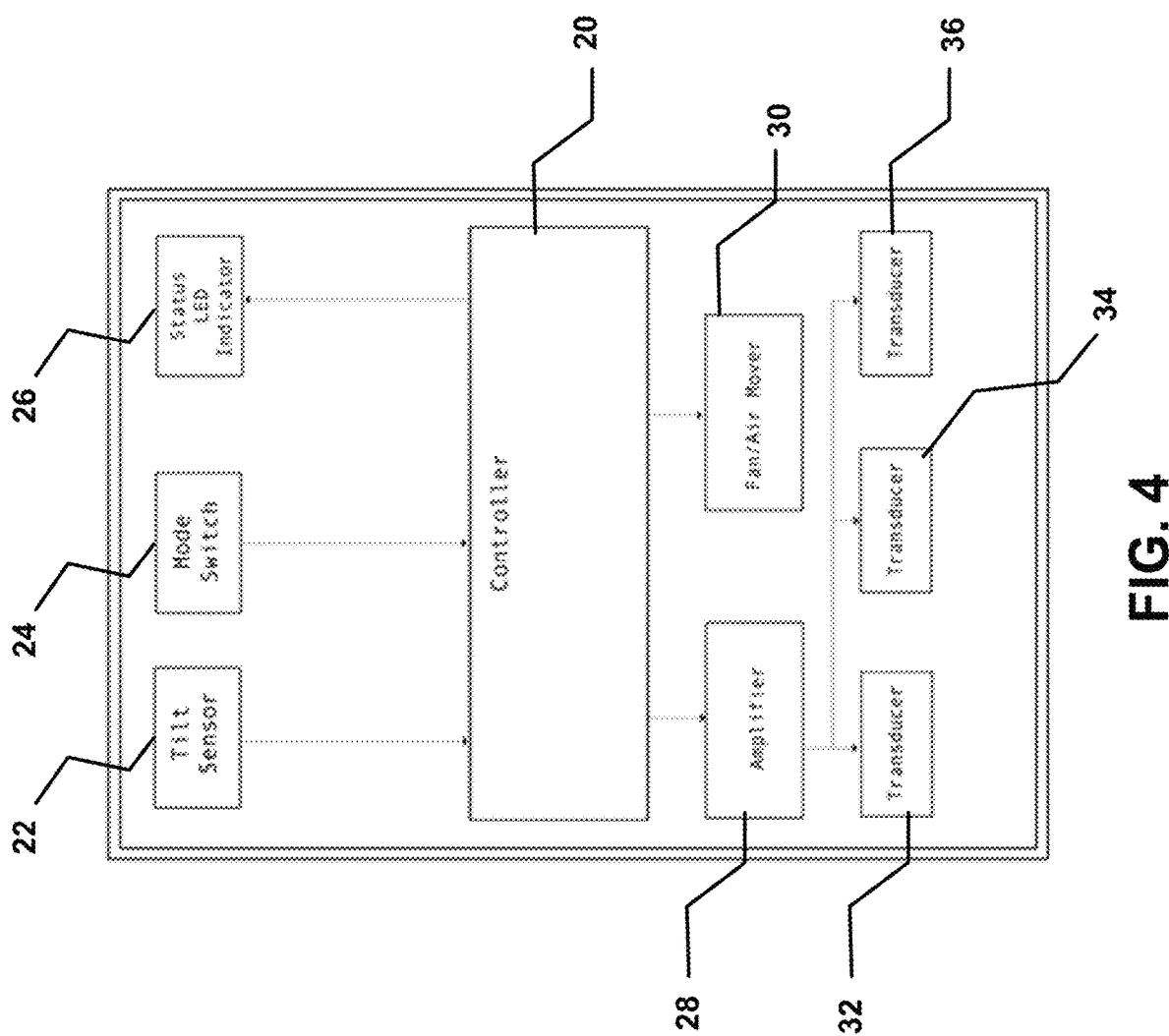
FIG. 4 is a schematic representation of some of the active components of the phone case accessory in accordance with an embodiment.

Some of the active components of the component housing 14 are illustrated in the schematic drawing of FIG. 4. For example, the battery and/or other components are not included but could be. The controller 20 receives inputs from a tilt sensor 22 and a mode switch 24 that enable a user to control the mode of the accessory, i.e., either privacy mode (on) or non-privacy mode (off). The user may control the on/off mode manually with the mode switch 24 or program the controller to change the mode automatically based on a setting. For example, the mode may turn on or off based on a position of the accessory relative to gravity, which may be determined by inputs from the tilt sensor 22. Ideally, the position of the case relative to gravity that is sufficient to activate or deactivate the on/off mode would be relatively unique, such as two or three different turns or tilts of the case in quick succession, so the likelihood of accidental activation/deactivation is low. Status LED indicated 26 may indicate when the mode is on and off.

When the mode of the phone case accessory 10 is on, the controller 20 outputs signals that activate the amplifier 28, to output signals to the transducers 32, 34, 36, and fan or air mover 30. When activated, each of the transducers 32, 34, 36, which may be a small speaker, generate ultrasonic frequency noise that disables a specific receiver of a smart device, such as a microphone, that is located near the position of the transducer. In particular, the transducers, using the amplifier to add power, inhibit a receiver of a smart device from being able to recognize spoken words or signal patterns, such as musical notes. This may be achieved by generating a sound pressure level (SPL) that is greater or equal any signal the receiver of the smart device is receiving. In other words, the transducer decreases the relative signal-to-noise ratio (SNR) (or increases the noise floor) of the receiver of the smart device to a point where the receiver of the smart device can no longer recognize spoken works or signal patterns over the environmental background. When the SNR is greater than 0dB, the power of the signal being received by the receiver of the smart devices is greater than the power of the noise of the environment, the receiver of the smart device will be able to recognize the signal. This occurs when the mode of the case is off. A negative SNR occurs when the mode of the case is on because the power of the noise is greater than the power of the signal being received by the receiver of the smart device.

In operation, software embedded in the controller 20 may instruct the amplifier to increase frequency signals transmitted by the controller to a power level, that when converted to sound pressure by the transducers, will cause the SNR at each receiver of the smart device to be negative. The frequency range of the signals may be between 22 kHz to 30 KHz. The controller may further include software that implements a random frequency hopping algorithm that may cause each transducer to independently isolate each receiver of the smart device differently. Each transducer may also be acoustically attenuated so as to not affect other receivers of the smart devices in the same phone. In other words, each transducer may be uniquely coupled to each receiver of the smart device and therefore have no impact on any other receivers of the smart device. In an embodiment, there is one transducer for each receiver of the smart device but in embodiments there may be more than one transducer per receiver of the smart device. The random frequency hopping algorithm may be configured to prevent audio signal processing software implemented in the phone from recognizing any particular frequency in the noise being generated by the transducer and prevent such signal processing software from notch filtering or otherwise cancelling out the noise and increasing the SNR to a level above 0dB.

By hopping frequencies randomly at each transducer, the accessory decreases the possibility of a smart device being able to recognize a frequency and being able to notch it out or attenuate just that one frequency. The accessory does not prevent the smart devices from receiving the signals associated with spoken words or signal patterns. Rather, it prevents the audio signal processing software associated with the smart device from being able to isolate those signals from the other noise that is being generated. In most smart devices with multiple receivers, noise cancellation is typically accomplished by correlating two or more receivers of the smart device input to compare what is likely noise versus signal so the smart device can then filter out what it believes to be noise, either using real-time audio signal processing or post processing in another computing system accessible over a network connected to the smart device.

Figure 5:
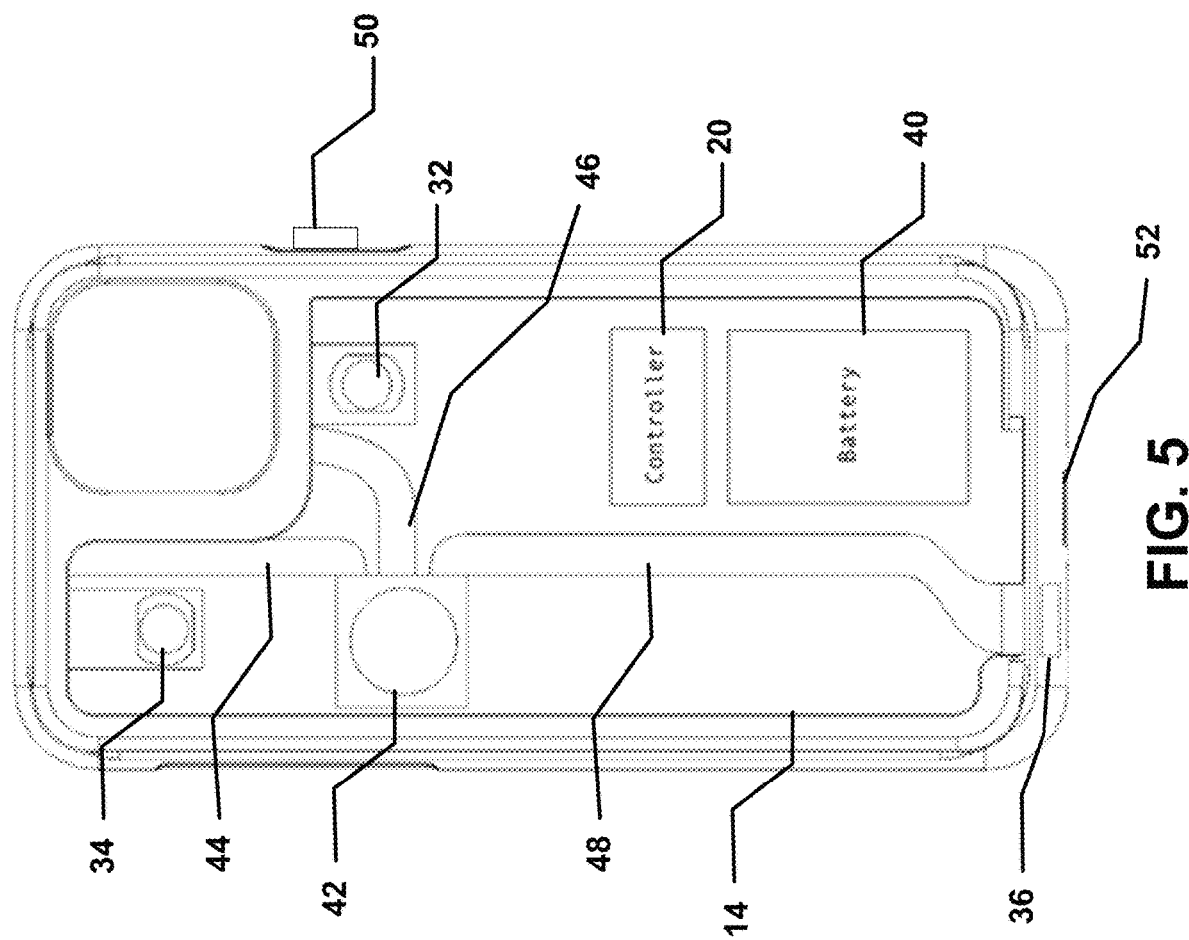
FIG. 5 is a top view of an internal layout of the fan/air mover and air ducts and other components of the phone case accessory in accordance with an embodiment.

FIG. 5 illustrates the location of some of the components within the component housing 14, although the size and location of the transducers and other components may be different for each accessory based on the smart device involved. The controller 20 and a battery 40 for providing power to the accessory may be located in an open area away from some of the other components, such as the fan or air mover 42 and the air ducts 44, 46, 48. The air ducts channel or funnel air generated by the fan 42 across the surface of each of the smart devices. The frequency of the sound of the air moving across the surface of each receiver of the listing device is about 500 Hz, which is within a lower range of human hearing but quite enough that it would be nearly silent to the user and any other humans nearby. However, the noise generated by the fan 42 is sufficient to augment the noise being generated by each transducer 32, 34, 36. The transducers deploy high frequency noise while the fan deploys low frequency noise. Alternating between high and low sound pressure levels in the zone of each receiver of the smart device may have an effect similar to the random hopping frequencies of each transducer.

Figure 6:
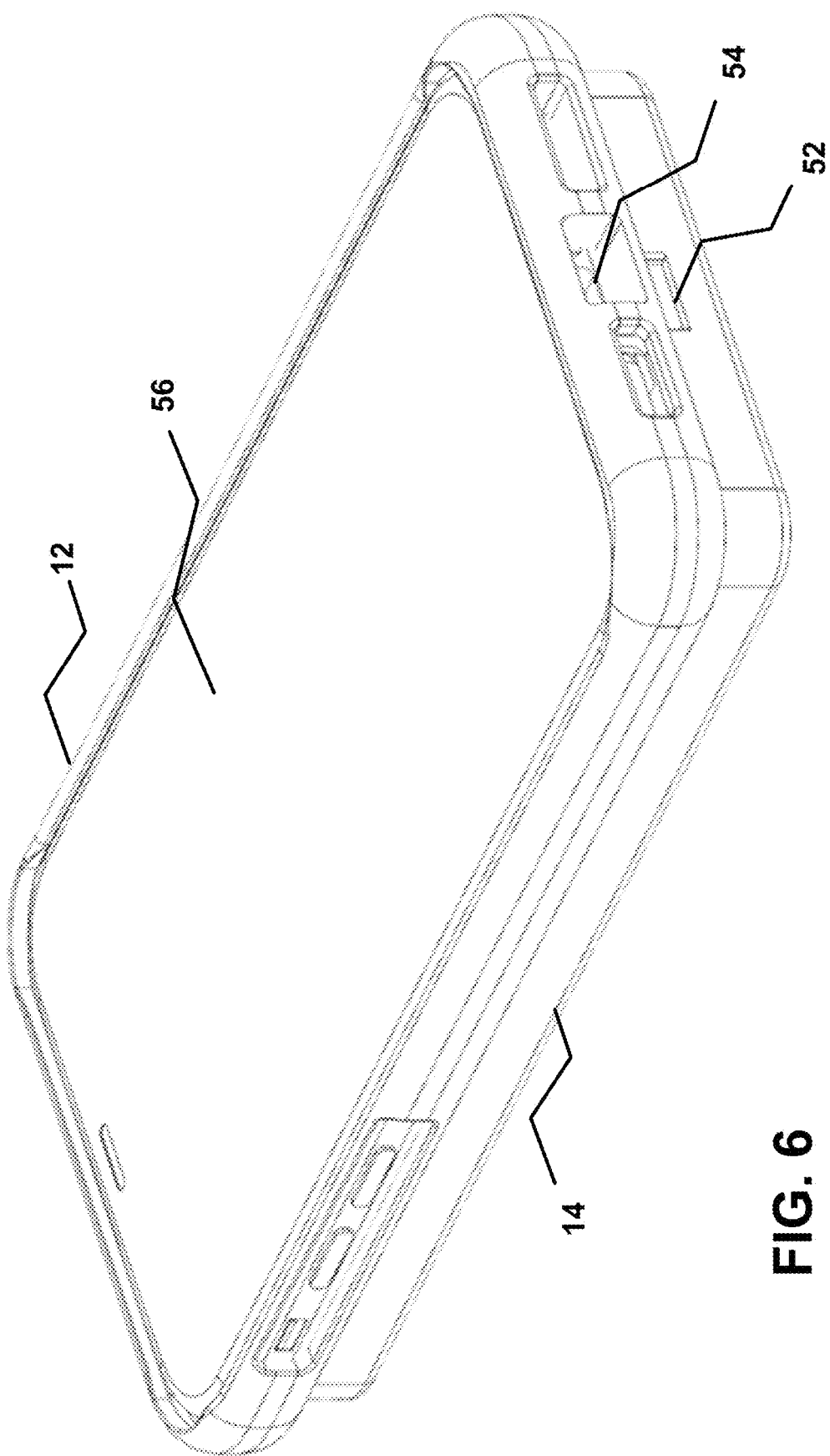
FIG. 6 is a perspective view of the phone case accessory installed on a phone in accordance with an embodiment.

An on/off switch 50 may be used by the user to turn the mode of the accessory on and off. A charging port 52 may be used to recharge the battery. The charging port may be the same type as used by the smart device for charging if the smart device is mobile. As illustrated in FIG. 6, the charging port 52, such as a USB port, of the component housing 14 for the phone case accessory 10 may be located directly below the USB charging port 54 for the phone 56, which is shown inserted into the protective case 12.

Figure 7:
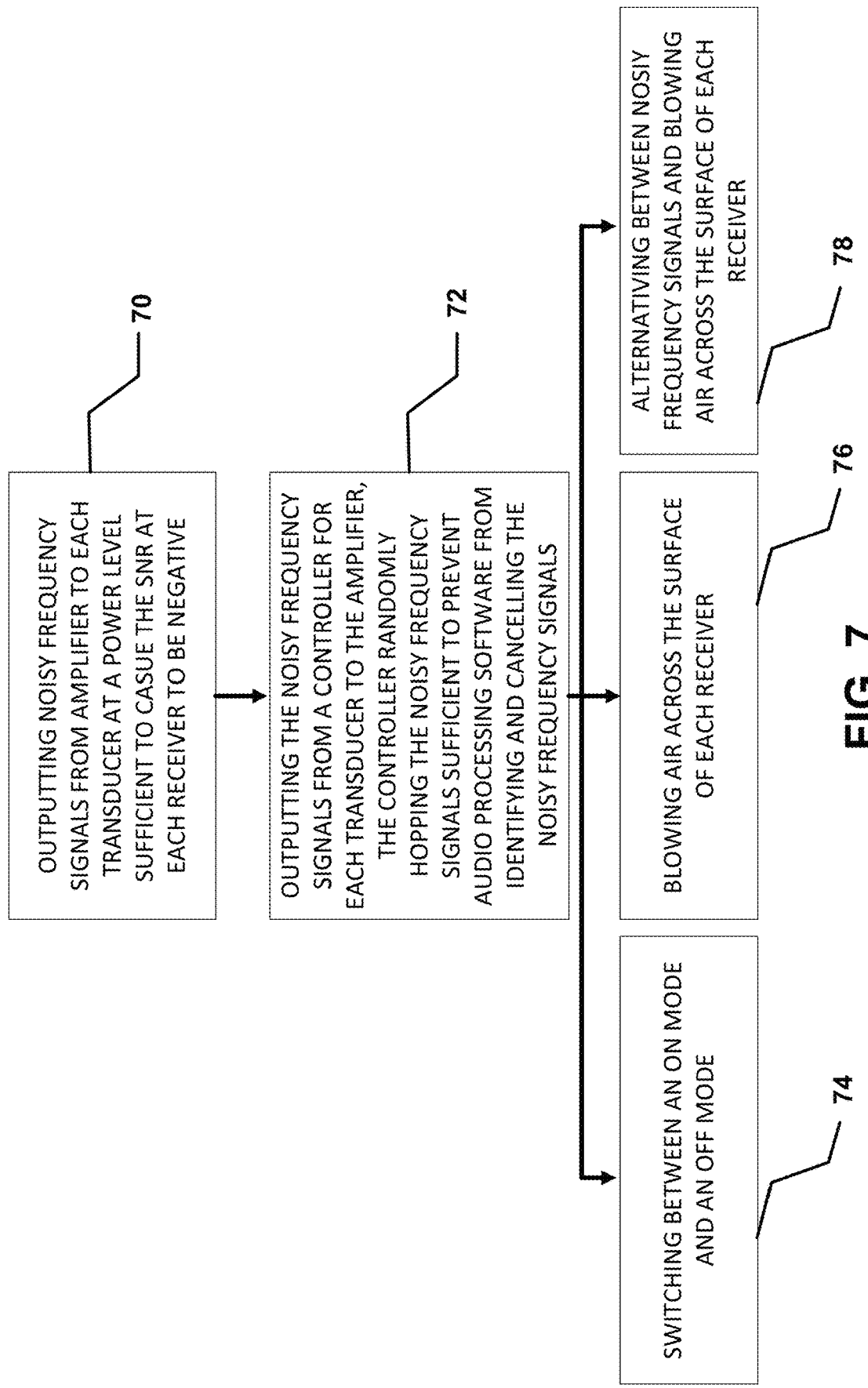
FIG. 7 is a flow chart of a method of controlling a mode of operation of an accessory for a smart device in accordance with an embodiment.

FIG. 7 is a flow chart illustrating an exemplary method for controlling a mode of operation of an accessory for a smart device. The method comprising, at step 70, outputting noisy frequency signals from an amplifier to each of at least one transducer per receiver in the smart device at a power level sufficient to cause the signal-to-noise ratio at each receiver to be negative, each transducer being physically located in close proximity to a physical location of each receiver. The method further including, at step 72, outputting the noisy frequency signals from a controller for each transducer to the amplifier according to a mode, the controller randomly hopping the noisy frequency signals for each transducer in a manner sufficient to prevent audio processing software associated with each receiver from being able to identify and cancel the noisy frequency signals.

In step 74, the method may include switching between an on mode and an off mode, which may be accomplished outputting tilt data from a tilt sensor within the accessory to the controller, the controller controlling the mode between an on mode and an off mode based on a position of the accessory relative to gravity as conveyed by the tilt data. The method of switching may further include the controller controlling the mode between an on mode and an off mode based on a position of a mode switch within the accessory. The method of switching may further include the controller indicating the mode based on a status indicator based on the mode.

In step 76, the method may further comprise blowing air from a fan in the accessory through a duct in the accessory and across a surface of each receiver of the smart devices. The frequency of sound made by the air blowing across the surface of each receiver of the listing device may be within a lower hearing range of humans.

In step 78, the method may further comprise alternating between outputting the noisy frequency signals and moving air across the surface of each receiver to further prevent audio processing software of the smart device from being able to identify and cancel the noisy frequency signals.

Figure 8:
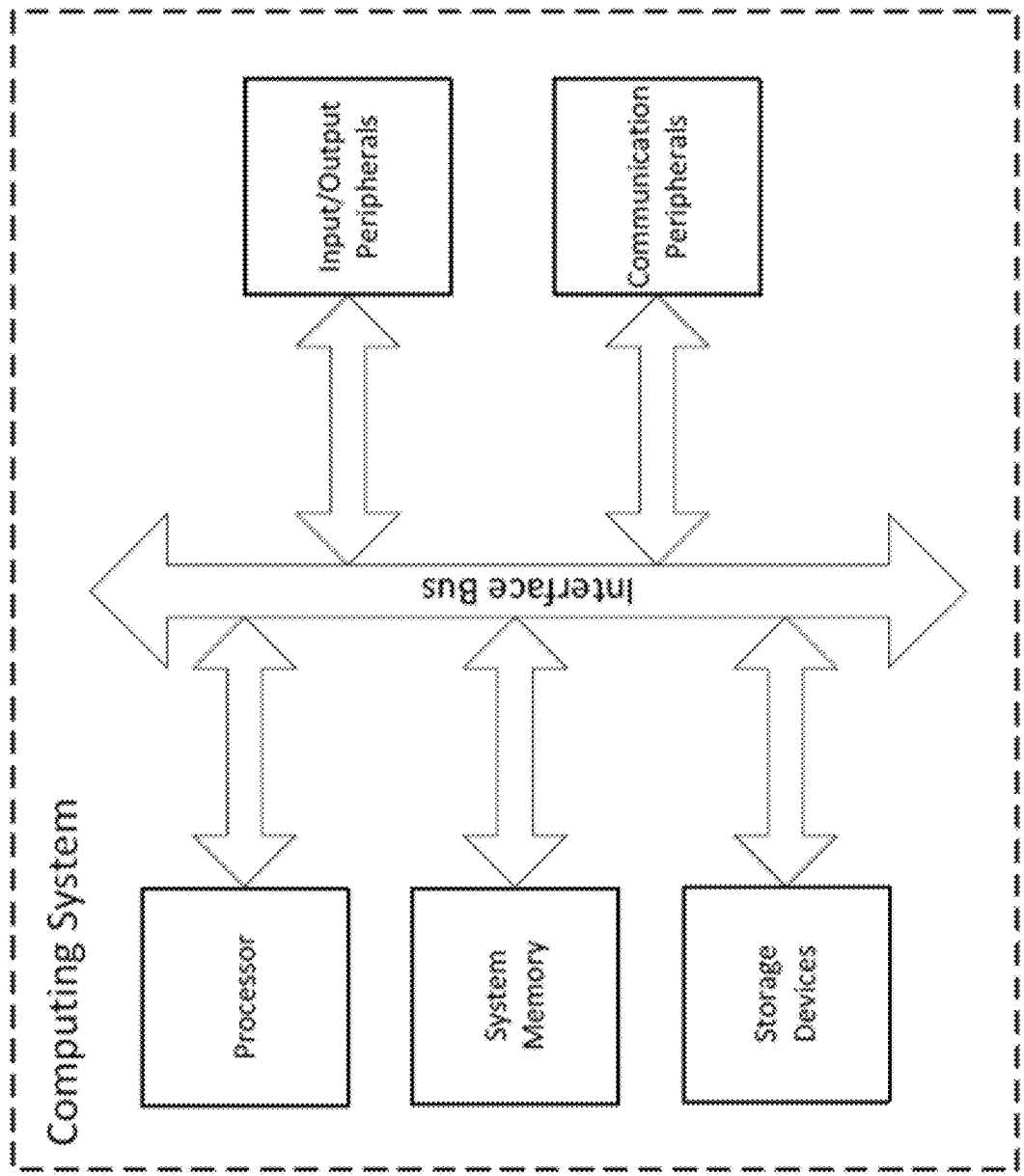
FIG. 8 is schematic representation of a computing system.

FIG. 8 illustrates an exemplary block diagram of a computing system that includes hardware modules, software module, and a combination thereof and that can be implemented as the controller 20. In a basic configuration, the computing system may include at least a processor, a system memory, a storage device, input/output peripherals, communication peripherals, and an interface bus. Depending on the complexity of the controller some components may not be necessary, such as the storage devices, input/output peripherals and the communication peripherals. Instructions stored in the memory may be executed by the processor to perform a variety of methods and operations, including the operation of the amplifier, transducers and the fan, as described above.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals may include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, and velocity/acceleration. RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a Wi-Fi/Bluetooth/broadband network, a local area network (LAN), a wide area network (WAN), a telephony network, a fiber-optic network, some other network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile, or non-volatile storage.

In an embodiment, an accessory for a smart device, comprising at least one transducer per receiver of the smart device, each transducer physically located in close proximity to a physical location of each receiver; an amplifier for outputting noisy frequency signals to each transducer at a power level sufficient to cause the signal-to-noise ratio at each receiver to be negative; and a controller for outputting the noisy frequency signals for each transducer to the amplifier according to a mode, the controller randomly hopping the noisy frequency signals for each transducer in a manner sufficient to prevent audio processing software associated with each receiver from being able to identify and cancel the noisy frequency signals.

In the embodiment, wherein the accessory further comprising: a protective frame for holding the smart device; and a component housing for holding each transducer, the amplifier and the controller.

In the embodiment, wherein the accessory further comprising a tilt sensor configured to output tilt data to the controller, the controller being further configured to control the mode between an on mode and an off mode based on a position of the accessory relative to gravity as conveyed by the tilt data.

In the embodiment, wherein the accessory further comprising a mode switch, the controller being further configured to control the mode between an on mode and an off mode based on a position of the mode switch.

In the embodiment, wherein the accessory further comprising a status indicator based on the mode.

In the embodiment, wherein the accessory further comprising a fan/air mover and a duct for channeling air from the fan/air mover to a surface of each receiver.

In the embodiment, wherein the frequency of sound made by the air moving across the surface of each receiver is within a lower hearing range of humans.

In the embodiment, wherein the controller alternates between outputting the noisy frequency signals and moving air across the surface of each receiver to further prevent the audio processing software from being able to identify and cancel the noisy frequency signals.

In the embodiment, wherein the noisy frequency signals are within a frequency range of between 22 kHz to 30 KHz.

In the embodiment, wherein the accessory further comprising a battery operative to be recharged by a charging port compatible with a charging port of the smart device.

In the embodiment, wherein each transducer is a speaker.

In an embodiment, a method for controlling a mode of operation of an accessory for a smart device, comprising: outputting noisy frequency signals from an amplifier to each of at least one transducer per receiver of the smart device at a power level sufficient to cause the signal-to-noise ratio at each receiver to be negative, each transducer being physically located in close proximity to a physical location of each receiver; and outputting the noisy frequency signals from a controller for each transducer to the amplifier according to a mode, the controller randomly hopping the noisy frequency signals for each transducer in a manner sufficient to prevent audio processing software associated with each receiver from being able to identify and cancel the noisy frequency signals.

In the embodiment, wherein the accessory includes a protective frame for holding the smart device and a component housing for holding each transducer, the amplifier and the controller.

In the embodiment, the method further comprising outputting tilt data from a tilt sensor within the accessory to the controller, the controller controlling the mode between an on mode and an off mode based on a position of the accessory relative to gravity as conveyed by the tilt data.

In the embodiment, the method further comprising the controller controlling the mode between an on mode and an off mode based on a position of a mode switch within the case.

In the embodiment, the method further comprising the controller indicating the mode based on a status indicator based on the mode.

In the embodiment, the method further comprising blowing air from a fan in the accessory through a duct in the accessory and across a surface of each receiver.

In the embodiment, wherein the frequency of sound made by the air blowing across the surface of each receiver is within a lower hearing range of humans.

In the embodiment, further comprising alternating between outputting the noisy frequency signals and moving air across the surface of each receiver to further prevent the audio processing software from being able to identify and cancel the noisy frequency signals.

In the embodiment, wherein the noisy frequency signals are within a frequency range of between 22 kHz to 30 kHz.

In the embodiment, the method further comprising recharging a battery powering the accessory through a charging port compatible with a charging port of the smart device.

In the embodiment, wherein each transducer is a speaker.

As previously noted, the various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. An accessory for a smart device, comprising:
a plurality of transducers, at least one transducer among the plurality of transducers physically located in proximity to each receiver among a plurality of receivers;
an amplifier; and
a controller and memory comprising instructions, which when executed by the controller cause the controller to:
recognize when a signal to noise ratio (SNR) at any receiver among the plurality of receivers is greater than 0 dB and cause the amplifier to increase noisy frequency signals transmitted to any corresponding transducer to cause the SNR, when the noisy frequency signals are converted to sound by the corresponding transducer, at each receiver to be negative; and
prevent audio processing software associated with each receiver among the plurality of receivers from being able to identify and cancel the noisy frequency signals by randomly hopping the noisy frequency signals output to each transducer corresponding to each receiver so as to independently isolate each receiver differently.

2. The accessory of claim 1, wherein the accessory further comprising:
a protective frame for holding the smart device; and
a component housing for holding each transducer, the amplifier and the controller.

3. The accessory of claim 2, wherein the component housing further includes a retractable shutter for blocking one or more lenses of the smart device.

4. The accessory of claim 1, wherein the accessory further comprising a tilt sensor configured to output tilt data to the controller, the controller being further configured to control the mode between an on mode and an off mode based on a position of the accessory relative to gravity as conveyed by the tilt data.

5. The accessory of claim 1, wherein the accessory further comprising a mode switch, the memory comprising further instructions, which when executed by the controller cause the controller to control the mode between an on mode and an off mode based on a position of the mode switch.

6. The accessory of claim 1, wherein the accessory further comprising a status indicator based on the mode.

7. The accessory of claim 1, wherein the accessory further comprising a fan/air mover and a duct for channeling air from the fan/air mover to a surface of each receiver.

8. The accessory of claim 7, wherein the frequency of sound made by the air moving across the surface of each receiver is within a lower hearing range of humans.

9. The accessory of claim 8, the memory comprising further instructions, which when executed by the controller cause the controller to alternate between outputting the noisy frequency signals and moving air across the surface of each receiver to further prevent the audio processing software from being able to identify and cancel the noisy frequency signals.

10. The accessory of claim 1, wherein the noisy frequency signals are within a frequency range of between 22 kHz to 30 kHz.

11. The accessory of claim 1, wherein the accessory further comprising a battery operative to be recharged by a charging port compatible with a charging port of the smart device.

12. The accessory of claim 1, further comprising a component housing having a retractable shutter for blocking one or more lenses of the smart device.

13. A method for controlling a mode of operation of an accessory for a smart device, comprising:
recognizing by a controller within the accessory when a signal to noise ratio (SNR) at any receiver among a plurality of receivers of the smart device is greater than 0 dB;
in response to the recognizing, the controller increasing a power level of a noisy frequency signal output from an amplifier of the accessory to any transducer among a plurality of transducers corresponding to and being physically located in proximity to the any receiver so as to cause the SNR at the any receiver to be negative; and
preventing audio processing software associated with each receiver among the plurality of receivers from being able to identify and cancel the noisy frequency signals by randomly hopping the noisy frequency signals output to each transducer corresponding to each receiver so as to independently isolate each receiver differently.

14. The method of claim 13, wherein the accessory includes a protective frame for holding the smart device and a component housing for holding each transducer, the amplifier and the controller.

15. The method of claim 14, wherein the component housing further includes a retractable shutter for blocking one or more lenses of the smart device, the method further comprising extending the shutter for visual privacy and retracting the shutter when no visual privacy is needed.

16. The method of claim 13, the method further comprising outputting tilt data from a tilt sensor within the accessory to the controller, the controller controlling the mode between an on mode and an off mode based on a position of the accessory relative to gravity as conveyed by the tilt data.

17. The method of claim 13, the method further comprising the controller controlling the mode between an on mode and an off mode based on a position of a mode switch within the accessory.

18. The method of claim 13, the method further comprising the controller indicating the mode based on a status indicator based on the mode.

19. The method of claim 13, the method further comprising blowing air from a fan in the accessory through a duct in the accessory and across a surface of each receiver.

20. The method of claim 19, wherein the frequency of sound made by the air blowing across the surface of each receiver is within a lower hearing range of humans.

21. The method of claim 20, further comprising alternating between outputting the noisy frequency signals and moving air across the surface of each receiver to further prevent the audio processing software from being able to identify and cancel the noisy frequency signals.

22. The method of claim 13, wherein the noisy frequency signals are within a frequency range of between 22 kHz to 30 kHz.

23. The method of claim 13, the method further comprising recharging a battery powering the accessory through a charging port compatible with a charging port of the smart device.

24. The method of claim 13, wherein the accessory includes a component housing having a retractable shutter for blocking one or more lenses of the smart device, the method further comprising extending the shutter for visual privacy and retracting the shutter when no visual privacy is needed.

\* \* \* \* \*